(12) United States Patent
Stumpf

(10) Patent No.: US 9,764,417 B2
(45) Date of Patent: Sep. 19, 2017

(54) FRICTION WELDING ELEMENT, AND A METHOD FOR CONNECTING THE FRICTION WELDING ELEMENT TO A HOUSING

(71) Applicant: BÖLLHOFF VERBINDUNGSTECHNIK GMBH, Bielefeld (DE)

(72) Inventor: Michael Stumpf, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 14/768,477

(22) PCT Filed: Feb. 4, 2014

(86) PCT No.: PCT/EP2014/052151
§ 371 (c)(1),
(2) Date: Aug. 18, 2015

(87) PCT Pub. No.: WO2014/124841
PCT Pub. Date: Aug. 21, 2014

(65) Prior Publication Data
US 2016/0001394 A1   Jan. 7, 2016

(30) Foreign Application Priority Data
Feb. 18, 2013   (DE) ........................ 10 2013 202 583

(51) Int. Cl.
*B23K 20/12* (2006.01)
*B23K 35/02* (2006.01)
(Continued)

(52) U.S. Cl.
CPC ............ *B23K 20/12* (2013.01); *B23K 20/129* (2013.01); *B23K 35/02* (2013.01); *B29C 65/069* (2013.01);
(Continued)

(58) Field of Classification Search
CPC .. B23K 20/1295; B23K 20/12; B23K 20/122; B23K 20/127; B23K 20/1225;
(Continued)

(56) References Cited

U.S. PATENT DOCUMENTS 3,547,741 A    12/1970  Hewitt
4,987,714 A *   1/1991  Lemke ................. E04D 3/3603
                                                411/369
(Continued)

FOREIGN PATENT DOCUMENTS

CN      1298341      6/2001
CN      101678499    3/2010
(Continued)

OTHER PUBLICATIONS

English translation of the International Preliminary Report on Patentability for PCT/EP2014/052151 dated Aug. 27, 2015, 8 pages.
(Continued)

*Primary Examiner* — Erin Saad
(74) *Attorney, Agent, or Firm* — Reising Ethington P.C.

(57) ABSTRACT

A friction welding method for fastening a connection bushing, such as a threaded bushing for example, in a housing. In order to improve the quality of the connection, the connection bushing is attached to the housing using a friction welding element. The friction welding element consists of the connection bushing, on which a friction welding shell with a radially outer friction welding contour is formed or molded. Connecting and sealing portions are produced between the friction welding element and the housing during the friction welding process by means of a special design of the friction welding contour.

6 Claims, 3 Drawing Sheets

Figure 2:
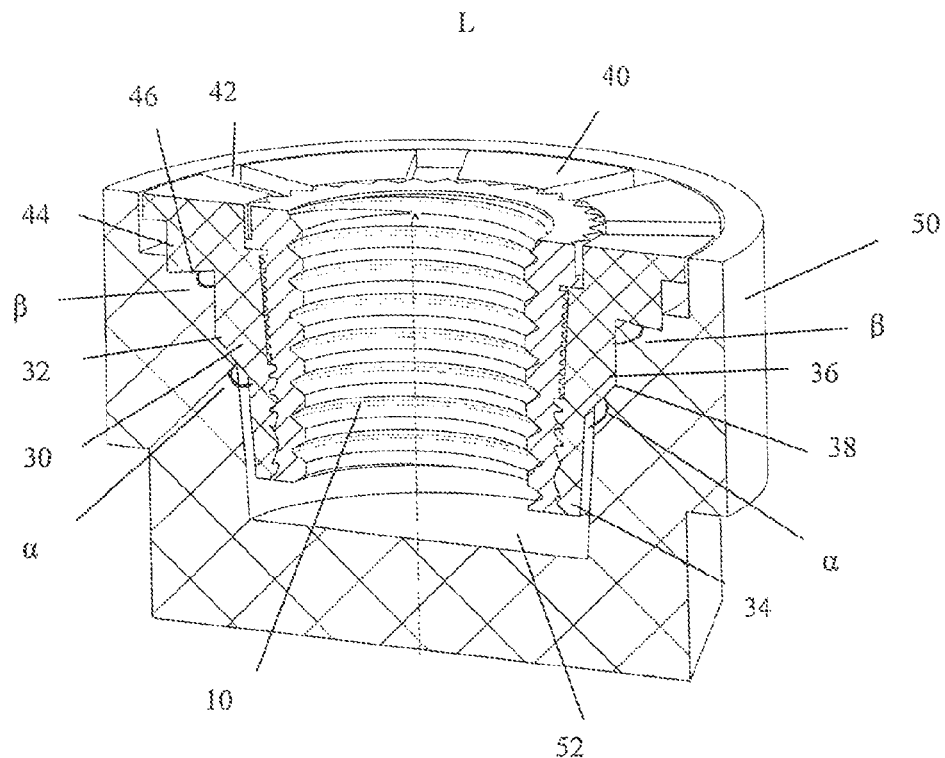

(51) Int. Cl.

| | |
|---|---|
| B29L 1/00 | (2006.01) |
| B29C 65/06 | (2006.01) |
| B29C 65/10 | (2006.01) |
| B29C 65/00 | (2006.01) |
| F16B 37/06 | (2006.01) |
| F16B 37/12 | (2006.01) |
| B29K 105/16 | (2006.01) |
| B29K 509/08 | (2006.01) |
| B29L 9/00 | (2006.01) |
| B23K 103/00 | (2006.01) |
| B23K 103/12 | (2006.01) |
| B23K 103/16 | (2006.01) |
| B23K 103/18 | (2006.01) |
| B23K 103/04 | (2006.01) |

(52) U.S. Cl.
CPC ...... *B29C 66/1284* (2013.01); *B29C 66/1286* (2013.01); *B29C 66/12822* (2013.01); *B29C 66/5344* (2013.01); *B29C 66/612* (2013.01); *B29C 66/7392* (2013.01); *B23K 2203/05* (2015.10); *B23K 2203/12* (2013.01); *B23K 2203/16* (2013.01); *B23K 2203/18* (2013.01); *B23K 2203/42* (2015.10); *B29C 65/0618* (2013.01); *B29C 65/0627* (2013.01); *B29C 65/0636* (2013.01); *B29C 65/10* (2013.01); *B29C 66/0242* (2013.01); *B29C 66/1312* (2013.01); *B29C 66/545* (2013.01); *B29C 66/71* (2013.01); *B29C 66/721* (2013.01); *B29C 66/7394* (2013.01); *B29C 66/73921* (2013.01); *B29C 66/742* (2013.01); *B29C 66/8322* (2013.01); *B29K 2105/16* (2013.01); *B29K 2509/08* (2013.01); *B29L 2001/005* (2013.01); *B29L 2009/00* (2013.01); *F16B 37/061* (2013.01); *F16B 37/122* (2013.01)

(58) Field of Classification Search
CPC .... F16B 37/061; F16B 13/065; F16B 13/124; F16B 19/1081; B29C 65/0672; B29C 66/8322

USPC ............... 228/2.1, 112.1, 113, 114.5, 2.3
See application file for complete search history.

(56) References Cited

U.S. PATENT DOCUMENTS

| | | | |
|---|---|---|---|
| 5,054,980 | A | 10/1991 | Bidefeld |
| 5,078,294 | A * | 1/1992 | Staubli ................. F16B 13/065 220/233 |
| 6,793,095 | B1 | 9/2004 | Dulisse et al. |
| 8,486,508 | B2 | 7/2013 | Christ et al. |
| 2004/0109740 | A1 | 6/2004 | Nilsen |
| 2006/0266797 | A1 | 11/2006 | Kainer et al. |
| 2007/0190859 | A1 | 8/2007 | Christ et al. |
| 2009/0120940 | A1* | 5/2009 | Shah ....................... F16J 13/12 220/363 |

FOREIGN PATENT DOCUMENTS

| | | |
|---|---|---|
| DE | 3209920 A1 | 9/1983 |
| DE | 10233259 A1 | 2/2004 |
| DE | 202006002173 U1 | 6/2007 |
| DE | 102008007541 A1 | 8/2009 |
| DE | 102011009682 A1 | 8/2011 |
| DE | 102010018091 A1 | 10/2011 |
| DE | 102011000544 A1 | 8/2012 |
| EP | 0372663 A1 | 6/1990 |
| EP | 1160071 A2 | 12/2001 |
| GB | 1149467 | 4/1969 |
| WO | WO03046390 A2 | 6/2003 |

OTHER PUBLICATIONS

CN Office Action for CN Application No. 201480010478.0 dated Apr. 5, 2016 (5 pages).
EP Office Action for EP Application No. 14702607.4 dated Oct. 21, 2016 (5 pages).
Written Opinion & International Search Report for PCT/EP2014/052151 dated Apr. 14, 2014, 11 pages.

* cited by examiner

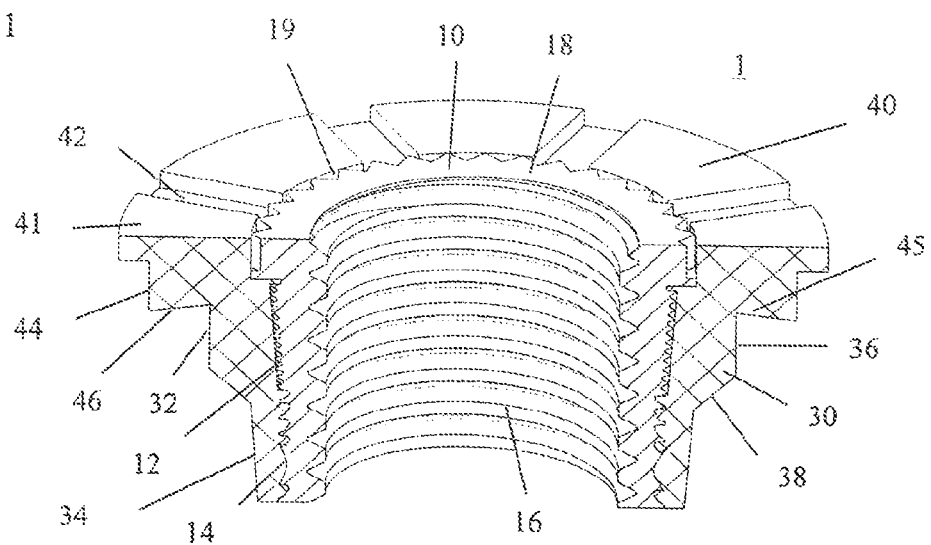
Fig. 1
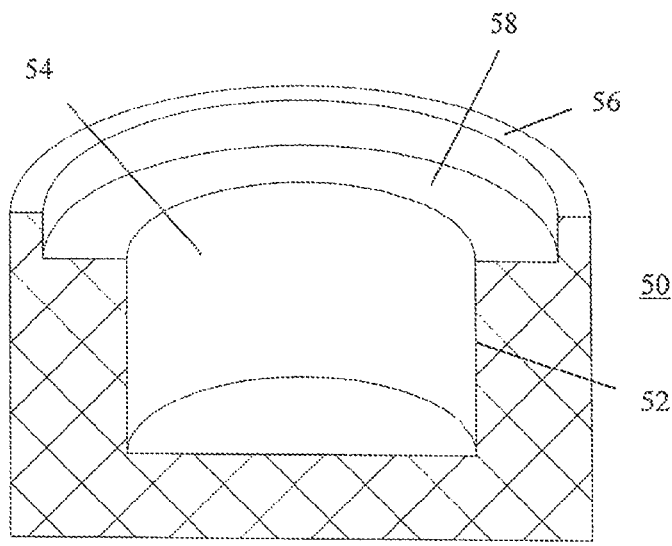

FRICTION WELDING ELEMENT, AND A METHOD FOR CONNECTING THE FRICTION WELDING ELEMENT TO A HOUSING

1. TECHNICAL FIELD

The present invention relates to a friction welding element consisting of a radially inner connection bushing with a friction welding shell formed or molded radially outwardly. Furthermore, the present invention relates to a housing having a channel in which the friction welding element according to the invention has been attached by means of friction welding, ultrasonic joining or joining by means of hot gas. In addition, the present invention describes a connection method for fastening the friction welding element in the housing in a friction welding manner.

2. BACKGROUND

There are various technical applications for fastening a connection bushing, such as a threaded insert, in a housing. For example, if such a housing is used in a cooling water circuit or a hydraulic circuit of a machine, such a connection bushing is used for the connection of a line containing fluid to the housing. From this it follows that the connection bushing has to be fastened in the housing pressure-tight so that no leakage in the water, oil, gas or hydraulic circuit occurs.

Currently, metallic threaded inserts are installed as connection bushing in plastic housings in various ways. These housings consist for example of thermoplastic materials with or without fiber reinforcement.

According to a known manufacturing alternative, the connection bushing is positioned during the production of the housing in the mould of the housing, and is then insert moulded or overmoulded with the selected plastic. This requires a complex construction of the shape of the housing, in which the connection bushing is not only held position-proof but is also closed by means of for example a core pin. In this manner, in addition to the forming or molding into the housing wall, it is also ensured that the interior of the connection bushing is kept free of material during the manufacturing process.

Furthermore, there exists the possibility to provide the connection bushing with a separate sealing ring, such as an O-ring, and to press it into the wall of the housing. According to a third manufacturing alternative the metallic connection bushing is inductively heated and embedded into the housing wall.

However, various disadvantages are associated with the manufacturing alternatives described above, which adversely affect in particular the pressure-tight connection between housing and connection bushing. If, for example, the sealing function is mainly realized by the O-ring, the material of the O-ring has to be adapted necessarily to the liquids to be passed through the connection bushing. Otherwise, aggressive media could cause that the O-ring is damaged and thereby the tightness is reduced. Another disadvantage often is that the O-ring material must withstand the thermal stress during the installation of the connection bushing and during the use of the connection provided by the connection bushing. Already from the compromise which is necessary with respect to the material of the sealing O-ring it results that neither an optimal resistance of the O-ring with respect to aggressive media nor an ideal temperature resistance is achieved. In addition, it is possible that the sealing ring is damaged during the pressing in because of the occurring mechanical stresses. A further disadvantage is that in the course of the operation of such a housing with connection bushing and sealing O-ring, this O-ring ages and the sealing ring material gets brittle. This embrittlement of the sealing ring material affects also adversely the tightness of the connection produced.

EP 1160071 A2 describes a friction welding method for a pin-like threaded element. Here, the pin-like threaded element is first mounted in a friction welding bushing by means of its external thread. Thereafter, the friction welding bushing is rotated via the pin-like threaded element and mounted in a channel in a friction welding manner. The channel is provided in a mounting dome as an opening in a componet or as a depression in a component. As the torque for friction welding is transmitted from the pin-like threaded element to the friction welding bushing, this mechanical stress weakens the connection between pin-like threaded element and friction welding bushing. This has a negative effect on the connection to be produced finally between pin-like threaded element and component.

It is therefore an object of at least some implementations of the present invention to fasten a connection bushing, such as a threaded bushing, in a reliable and efficient manner at different locations in a housing and/or in different housings, so that this connection bushing may be used as a connection point for different purposes.

3. SUMMARY

The above mentioned object is achieved by a friction welding element according to independent claim 1, a housing having at least one friction welding element fixed therein according to independent claim 9 as well as by a connection method by means of which a connection bushing of a friction welding element is fastenable in a channel of a housing according to independent claim 11. Preferred embodiments and further developments of the present invention will become apparent from the following description, the accompanying drawings and the appending claims.

The friction welding element according to at least some implementations of the invention, which is fastenable in a channel of a housing by means of a friction welding method, comprises a connection bushing having a radially inner side and a friction welding shell formed or molded on a radially outer side of the connection bushing. The friction welding shell comprises a radially outer friction welding contour for the firmly bonded or material bonded connecting to the housing, which comprises in the axial direction at least one conically shaped gradation and a circumferentially arranged collar which is arranged axially adjacent to one end of the connection bushing and which comprises at a collar top side facing away from the friction welding contour at least one drive or clutch means for rotating the friction welding element.

To be able to fasten the connection bushing, such as a threaded bushing or a bushing having an inner bayonet closure or quick closure, reliably in a housing for a cooling system, for example, the connection bushing is provided on its radially outer surface with a friction welding shell. This friction welding shell is formed, according to an alternative, so that it is sufficiently fastened on the radial outer side of the connection bushing. In case the fastened connection serves as a liquid or gas connection, then the friction welding element is arranged according to this preferred embodiment rotation-proof and pressure-tight in the housing. For producing a reliable connection between the connection bushing and the friction welding shell, the connection bushing has on its radially outer side a profiling, preferably a knurling or a dovetail-like anchor structure, by means of which the friction welding shell is fastened at the connection bushing. Especially this structural design realizes a non-rotatable and pressure-tight fastening of the connection bushing in the friction welding shell and later in the housing. The connection bushing can serve for both, the connection of liquid or gas lines, as well as the creation of an attachment point for attachment parts.

The friction welding shell has a radially outwardly disposed friction welding contour, so that the connection bushing is fastenable in the housing by means of friction welding. From this it follows that the connection bushing with the friction welding shell formed thereon constitute the friction welding element according to at least some implementations of the invention. The friction welding contour extends circumferentially and in axial direction of the connection bushing. To be able to establish a reliable connection between friction welding shell and housing by means of known friction welding methods, at least one conically shaped gradation is provided in the axial direction of the friction welding contour. This conically shaped gradation may extend over the entire axial length of the friction welding shell or the friction welding shell has preferably also a plurality of conical gradations distributed over the axial length of the friction welding shell. If the connection bushing having a so shaped friction welding contour is pressed rotatingly into a channel of a housing, the conically shaped surfaces generate friction surfaces with the boundary walls of the channel of the housing, at which material is then melted and mixed with each other connectively. Preferably, the channel is formed cylindrically. According to a further embodiment, the channel has an inclined radially inner wall in the shape of a cone, wherein the radially inner wall encloses with the longitudinal axis of the channel an angle in the range of greater than 0° to 20°, preferably greater than 0° to 10°.

Friction welding methods use a relative movement between two components to be fastened at each other, by means of which the material-melting heat is produced by means of friction in surface areas abutting each other. This relative movement is created, for example, by means of rotation of at least one of the two components, by means of an oscillating rotary movement or by means of an axial vibration between the components or by means of a combination of this movement, such as in the orbital friction welding. Therefore, the terms "friction welding" and "friction welding processes" as used herein cannot be understood as being limited to the rotary friction welding.

The inventively circumferentially arranged collar as part of the friction welding shell and preferably also of the friction welding contour limits first of all the axial insertion of the friction welding element into the channel of the housing. Furthermore, this collar provides drive means or a drive coupling so that the friction welding element can be rotated in the course of a friction welding method. Since these drive means are preferably arranged sunk in the collar, a flush arrangement of the collar with the remaining of the housing is preferred for example after completion of the friction welding process.

Since the circumferentially arranged collar provides in addition to the axially extending friction welding contour friction surfaces and abutment points with the housing, also at this locations a melting of the material by friction as well as a connecting between friction welding element and housing takes place. This ensures in addition to the remaining connecting friction welding shell the reliable and pressure-tight anchorage of the connection bushing in the housing.

According to a preferred construction of the friction welding element, the friction welding contour comprises at least a first and a second cylindrical portion which are interconnected via the at least one conically shaped gradation. These at least two cylindrical portions serve for an improved connection between the friction welding element and the cylindrical channel of the housing. Preferably, namely, an outer diameter of the first cylindrical portion is formed larger and an outer diameter of the second cylindrical portion is formed smaller than an inner diameter of the channel of the housing. Based on this constructive embodiment, especially the first cylindrical portion of the friction welding shell is melted during the friction welding process and the rotating inserting of the friction welding element into the cylindrical channel of the housing and contributes to establishing the connection between the friction welding element and the housing. The second cylindrical portion of the friction welding shell is radially spaced from the cylindrical inner wall of the channel of the housing due to its outer diameter. Based on this construction, the friction welding element will not yet be charged with a torsional moment at the rotating inserting of the second cylindrical portion in the channel. During the subsequent friction welding and plasticizing of material of the friction welding shell and/or the housing, this material is displaced preferably in the gap between the channel wall and the second cylindrical portion of the friction welding shell. Once this displaced material cures in this gap, it contributes to the sealing of the connection between friction welding element and housing, so that in addition to the welding areas additional sealing areas are present.

According to another preferred embodiment, the conical gradation of the friction welding shell encloses with the longitudinal axis of the friction welding element an angle >90°. The arrangement of this conical gradation supports the rotating inserting of the friction welding element into the channel of the housing. According to a further preferred embodiment of the friction welding element, the collar bottom side facing the friction welding contour is arranged in radial direction inclined perpendicular to the longitudinal axis of the friction welding element. Since the collar bottom side faces the housing, it provides a friction surface even after sufficient penetration of the friction welding element into the channel of the housing. As far as material is melted at this collar bottom side due to the heat generated by friction, it connects to the melted material of the housing in this portion.

In another preferred embodiment, the collar bottom side of the friction welding shell encloses with the longitudinal axis of the friction welding element an angle <90°. This preferred angular arrangement of the collar bottom side causes that material softened by heat is displaced radially inwardly. This directed material displacement in the radial direction to the connection bushing and the friction welding shell supports the establishing of the connection between friction welding element and housing as well as a sufficient sealing of this connection in favor of its later usage.

While the connection bushing is preferably made of metal, such as stainless steel, brass or another alloy, the friction welding shell is produced from a thermoplastic material with or without fiber reinforcement. In combination with this, the housing preferably also consists of a thermoplastic synthetic material with or without fiber reinforcement. As exemplary materials polypropylene (PP), polyamide having a glass fiber content (PA 6.6 GF 30) or polyamide (PA) without glass fiber reinforcement are preferred. Generally, a firm bond is achieved by the usage of identical or compatible plastics for the friction welding element and the housing. Therefore, the following materials or mixtures (polyblends) thereof are also preferred for the production of the housing and the friction welding element: polycarbonate as impact-resistant thermoplastic (PC+ABS), PC/ABS, PC+ABS/PC and ABS+ABS/PC. It is further conceivable to provide a duroplast or thermosetting material for the production of the housing. During the friction welding process, the friction welding shell consisting of a thermoplastic preferably provides a polymeric clawing or locking to the duroplastic housing so that also thereby a reliable connection is achieved. If fiber-reinforced plastics shall be used as housing and friction welding shell, the fiber content in the friction welding shell compared to the material of the housing is preferably lower or equal to zero.

According to a further preferred embodiment of the present invention, and in addition to the connection bushing, the friction welding shell also consists of a metal, as for example of a metal injection molding or of a metal pressure casting. Exemplarily, here a zinc and an aluminum die casting process have to be mentioned for forming or molding the friction welding shell to the connection bushing. In coordination to this, the housing is also made of a metal, such as zinc or aluminum, so that a metallic friction welding connection between the friction welding shell and the housing is achieved during the connection process.

The present invention, in at least some implementations, also includes a housing having a channel in which a friction welding element in accordance with one of the embodiments described above has been secured by means of friction welding. According to a further preferred embodiment, the collar top side of the friction welding element is aligned with an axial end of the connection bushing so that the friction welding element may also be inserted into the channel flush with the outside of the housing by means of friction welding.

The present invention, in at least some implementations, further comprises a connection method, by means of which the connection bushing of the friction welding element may be fastened in a channel of the housing. This connection method comprises the following steps: forming or molding of the friction welding shell at a radially outer side of the connection bushing comprising a radially outer friction welding contour including in axial direction at least one conically shaped gradation and a circumferentially arranged collar which is arranged axially adjacent to an end of the connection bushing and comprises at the collar top side facing away from the friction welding contour at least one drive means for a relative movement, preferably rotating, of the friction welding element, relatively moving, preferably rotating the friction welding element about its longitudinal axis, the friction welding element by means of the drive means at the collar top side and moving of the relatively moved, preferably rotated, friction welding element in axial direction into the channel of the housing, so that a firm bond or material bond between the friction welding element and the housing occurs. The mentioned relative movement between the housing and the friction welding element is achievable in addition to a rotation of the friction welding element also by means of a torsional vibration or oscillation, that is, by means of a reciprocating movement of the friction welding element occurring over a limited rotating angle in the channel of the housing, or by means of an axial oscillation, that is, by means of an axial reciprocating movement of the friction welding element within the channel of the housing. Especially when using very small amplitudes at torsional oscillations and/or axial oscillations, also friction welding elements are fastenable which are not rotationally symmetrical and/or which shall be installed in non-rotationally symmetric channels. Another alternative exists in the combination of the above relative movements or a selection of relative movements, so that a relative orbital oscillation is present.

In a preferred embodiment of the connection method described above, a melting of material for the friction welding connection occurs by means of friction between the radial inner side of the channel and a first and a second conical portion, preferably a plurality of conical portions, of the friction welding element, wherein the first and the second conical portion are inclined with respect to the longitudinal axis of the friction welding element differently and/or oppositely.

This preferred embodiment of the friction welding shell has the consequence that additionally to the establishing of a connection between the friction welding element and the housing the softened material is pressed into gap portions between friction welding element and the housing. At these locations, the softened material contributes after cooling to the additional sealing of the connection between friction welding element and housing. In this way, the connection portions and sealing portions between friction welding element and housing complement each other.

4. BRIEF DESCRIPTION OF THE ACCOMPANYING DRAWINGS

Figure 3:
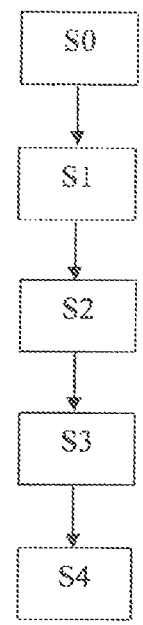

The present invention is further explained with reference to the accompanying drawings. It shows:

FIG. 1 an exploded view of a preferred embodiment of the invention consisting of the friction welding element and the housing, FIG. 2 a preferred embodiment of the friction welding element installed in the housing, and FIG. 3 flow chart for illustrating the preferred embodiment of the connection method.

5. DETAILED DESCRIPTION OF THE PREFERRED EMBODIMENTS

The present disclosure relates to a friction welding element 1 consisting of a connection bushing 10 and a friction welding shell 30. The friction welding element 1 is reliably fastenable in a channel 52 of a housing 50 by means of a friction welding process, preferably pressure-tight and therefore also liquid-tight. The present invention is explained based on the example of a cylindrical channel 52 in which the friction welding element 1 is fastened. As already has been explained above, the channel 52 may be also shaped differently. For fastening the friction welding element 1, the cylindrical channel 52 is open at both ends. It is also preferred to use a cylindrical channel 52 closed at one end for fastening the friction welding element 1. In this case, the friction welding element 1 realizes preferably an attachment point to fix an attachment part at the housing 50.

A preferred embodiment of the invention shows FIG. 1 in an exploded view consisting of the inventively preferred friction welding element 1 and a schematically indicated housing 50, while FIG. 2 shows the friction welding element 1 installed in the housing 50 by means of friction welding.

According to another preferred embodiment of the present invention, the connection bushing 10 consists of metal and the friction welding shell 30 formed at the radial outer side thereof consists of plastic. According to different preferred material alternatives, the friction welding shell 30 consists of a rigid and durable plastic such as thermoplastics with or without reinforcing fibers, such as polypropylene (PP), polyamide (PA) and PA6.6 GF 30; Polycarbonate and poly-blends, such as PC/ABS, PC+ABS, PC+ABS/PC, ABS+ABS/PC. In coordination with the friction welding shell 30, the housing 50 consists of a similar stable or the same material as the friction welding shell 30. It is also preferred that the housing 50 is made of a duroplast or thermosetting plastic, while the friction welding shell 30 is formed from a thermoplastic.

Certain characteristics of the invention are explained in the following based on the example of a friction welding shell 30 and a housing 50 made of plastic.

The connection bushing 10, described herein based on a threaded sleeve, has an internal thread 16, an optional bushing collar 18 as well as a radial outer side 12, 14. Instead of the internal thread 16, it is equally preferred to provide an alternative connection structure. This includes for example a bayonet closure, a locking connection or a plug connection.

According to a preferred embodiment of the present invention, the radial outer side of the connection bushing 10 is provided with a profile 12; 14. This profile 12; 14 supports the retention of the formed or molded friction welding shell 30. Preferably, the same profile or different profiles will be provided on the entire radially outer side. Thus, preferably, the region 12 has an outer knurling, while an inlay profile is disposed in the region 14. The inlay profile consists of a dovetail-like structure, in which the friction welding shell 30 can lock.

The profile or the profiles on the radially outer side of the connection bushing 10 have the advantage that they form a form fit or positive connection with the formed friction welding shell 30. During the forming of the friction welding shell 30 to the connection bushing 10, the material shrinks during cooling onto the profiles existing on the radially outer side of the connection bushing 10 and is anchored thereto in this manner. This reliable retaining of the friction welding shell 30 at the connection bushing 10 supports the connecting of the friction welding element 1 to the housing 50 by means of friction welding.

The bushing collar 18 acts also in a stabilizing or supporting manner on the connection between the connection bushing 10 and the friction welding shell 30. By means of its shape forming a recess, the friction welding shell 30 additionally anchors at this bushing collar 18. This effect can be further enhanced by a radially outer knurling 19 on the bushing collar 18 (see FIG. 1).

The molded or formed friction welding shell 30 preferably comprises a circumferentially arranged collar 40. This collar 40 is arranged axially adjacent to an end of the connection bushing 10. The collar 40 has a collar top side 41 and a collar bottom side 45, which are connected to each other preferably via a single or multiple graduated portion 44.

In the collar top side 41, preferably at least one drive means 42 is provided. This drive means 42 has the shape of a recess, a groove or a bore, which can be engaged in each case by means of a drive component. By engagement into the drive means 42, a rotation is transferable to the friction welding element 1 to fasten it in the cylindrical channel 52 of the housing 50 in a friction welding manner. The arrangement of the drive means 42 on the collar top side 41 ensures a direct application of force and torque into the friction welding shell 30. Thereby, the connection bushing 10 is not mechanically loaded during the friction welding, so that a reliable connection between the connection bushing 10 and the friction welding shell 30 remains guaranteed.

According to a preferred embodiment of the present invention, the collar top side 41 ends flush with the axial end of the connection bushing 10. As far as the friction welding element 1 is fully installed with the collar 40 in the cylindrical channel 52 of the housing 50, an aligning arrangement of the collar 40 with the adjacent housing wall 56 can be achieved. Of course it is also possible to fasten the friction welding element 1 in the cylindrical channel 52 of the housing 50 with an axial projection with respect to the housing wall 56.

For fastening the friction welding element 1 in the cylindrical channel 52, the friction welding element 1 comprises at its radially outer side a friction welding contour 32. The friction welding contour 32 extends in the axial direction of the friction welding element 1. According to a preferred embodiment, the friction welding contour 32 is formed tapered (not shown) over the entire length of the friction welding element 1 starting at the collar 40. A further embodiment comprises a friction welding contour 32 with at least a first 34 and a second cylindrical portion 36 having a different outer diameter. The two cylindrical portions 34, 36 are connected to each other via a first conical portion 38. It is also preferred to realize further cylindrical portions in the friction welding contour 32, wherein the transition between different cylindrical portions is provided by further conical portions.

The first conical portion 38 encloses preferably an angle $\alpha > 90°$ with the longitudinal axis L of the friction welding element 1 or the first cylindrical portion 34. The cylindrical portions 34, 36 are adapted in their outer diameter to the inner diameter of the cylindrical channel 52. Thus, preferably, the outer diameter of the first cylindrical portion 34 is smaller than the inner diameter of the cylindrical channel 52, while the outer diameter of the second cylindrical portion 36 is larger than the inner diameter of the cylindrical channel 52. Due to this construction of the friction welding contour 32, the first conical portion 38 meets the wall of the cylindrical channel 52 at the opening 54 during the friction welding and during the rotating as well as axial movement of the friction welding element 1 in the cylindrical channel 52. At the same time, the first cylindrical portion 34 forms a gap with the inner wall of the cylindrical channel 52. During the friction welding, the friction between the first conical portion 38 and the inner wall of the cylindrical channel 52 generates heat that softens the material of the inner wall of the cylindrical channel 52 and of the first conical portion 38. As a result, the friction welding element can penetrate further into the cylindrical channel 52 in the axial direction, so that friction and thus plastically deformable material at the interface between the second cylindrical portion 32 and the inner wall of the cylindrical channel 52 is created. During the simultaneous rotation and axial movement of the friction welding element 1 in the cylindrical channel 52, the plasticized materials of the friction welding element 1 and the housing 50 are mixed, compressed and displaced into the gap between the cylindrical portion 34 and the wall of the cylindrical channel 52. The displaced and plastically deformable material is received by the gap between the first cylindrical portion 34 and the inner wall of the cylindrical channel 52. After completion of the friction welding and solidification of the material in the gap, this material displaced into the gap supports the additional sealing of the connection between friction welding element 1 and housing 50.

Another sealing is achieved by the connection portion adjacent to the first conical portion 38, after the heated material is cured. The collar bottom side 45 is arranged perpendicular or at an angle β other than 90° to the longitudinal axis L of the friction welding element 1. According to a further preferred embodiment, the collar bottom side 45 encloses with the longitudinal axis L of the friction welding element 1 or with the second cylindrical portion 36 an angle β<90°. Once the collar bottom side 45 meets the housing wall 58 during the friction welding, the material in this friction zone is heated, plastically deformable and radially inwardly displaced due to the inclination of the collar bottom side 45. Thus, the displaced material accumulates at the interface between the second cylindrical portion 36 and the inner wall of the cylindrical channel 52. In this way, this material contributes after cooling to the sealing between friction welding element 1 and the housing 50 as additional sealing portion.

After the friction welding element 1 has been fastened completely in the cylindrical channel 52 by means of friction welding, a combination of welding and sealing portions thus cause a pressure-tight and reliable connection between the friction welding element 1 and the housing 50.

The method described above in extracts for connecting the connection bushing 10 to the housing 50 can therefore be summarized with the following steps. In step 1, the forming or molding of the friction welding shell 30 with friction welding contour 32 at the radial outer side of the connection bushing 10 takes place. During the forming, the advantageous conical portions 38, 46 and the cylindrical portions 34, 36 as well as the collar 40 or any arbitrary selection of these constructive elements are formed in the friction welding contour 32.

In step 2, the preferred friction welding element is relatively moved with respect to the housing 50 by means of the preferred drive means 42. Preferably, the relative movement consists in a rotation of the friction welding element 1 about its longitudinal axis L. In step 3, the relatively moving, preferably rotating, friction welding element is moved in the direction of its longitudinal axis L into the cylindrical channel 52 of the housing 50, so that connecting welding portions occur in the contact portions between the housing 50 and the friction welding shell 30. In the portions that receive displaced plastically deformable material, which subsequently solidifies, additional sealing portions are created. These additional sealing portions support the connection between the housing 50 and friction welding element 1. It thus results in step 4 a melting and selective displacing as well as a firmly bonded connecting of material, so that after solidification of the material, the advantageous friction welding connection between the connection bushing 10 and the housing 50 is present.

To support and prepare the production of a firmly bonded connection between the housing 50 and the friction welding element 1, preferably a preheating step S0 is used. Here, a heating of the surface portions or parts thereof which have to be plasticized by means of friction occurs by means of ultrasonic or the injection of hot gas, so that the plasticizing amount of energy to be introduced by the relative movement is reduced. In this way, the friction welding process is shortened, whereby process times can be optimized.

The invention claimed is:

1. Friction welding element which is fastenable by means of a friction-welding method in a channel of a housing, comprising:
   a connection bushing consisting of metal and having a central opening with a radial inner side and a friction welding shell formed and fastened on a radial outer side of the connection bushing, and the friction welding shell consisting of plastic and being adapted for melting upon friction welding heat application and bonding to the housing upon solidification, wherein the friction welding shell comprising:
   a radial outer friction welding contour formed by an outer surface of the friction welding shell for connecting with the housing having in an axial direction at least first and second cylindrical portions and at least one conically shaped gradation portion, wherein the first and second cylindrical portions are connected to each other by the at least one conically shaped gradation portion, and
   a circumferentially arranged collar that is connected to and formed in one piece with the friction welding shell, which is arranged axially adjacent to an end of the connection bushing and which comprises at least one drive means at a collar top side facing away from the friction welding contour adapted to be engaged by a drive component to rotate the collar and the friction welding element, and
   a collar bottom side facing the friction welding contour is arranged in the radial direction and is inclined with respect to the longitudinal axis of the friction welding element, wherein the collar bottom side is orientated at an angle β<90° with respect to the longitudinal axis of the friction welding element.

2. Friction welding element according to claim 1, in which the at least one conical gradation is oriented at an angle α>90° with respect to a longitudinal axis of the friction welding element.

3. Friction welding element according to claim 1, in which the collar top side is aligned with an axial end of the connection bushing.

4. Friction welding element according to claim 1, in which the housing consists of plastic.

5. Housing with at least one channel, in which a friction welding element according to claim 1 is fastened by means of friction welding.

6. Housing according to claim 5 wherein the friction welding contour comprises at least a first and a second cylindrical portion which are connected to each other by at least one conically shaped gradation, and in which an outer diameter of the first cylindrical portion is formed larger and an outer diameter of the second cylindrical portion is formed smaller than an inner diameter of the channel of the housing so that in the first cylindrical portion a connecting welding portion and in the second cylindrical portion a sealing portion is present between friction welding element and housing.

* * * * *